(No Model.)
C. D. HERSHEY.
POTATO DIGGER.
No. 578,635. Patented Mar. 9, 1897.
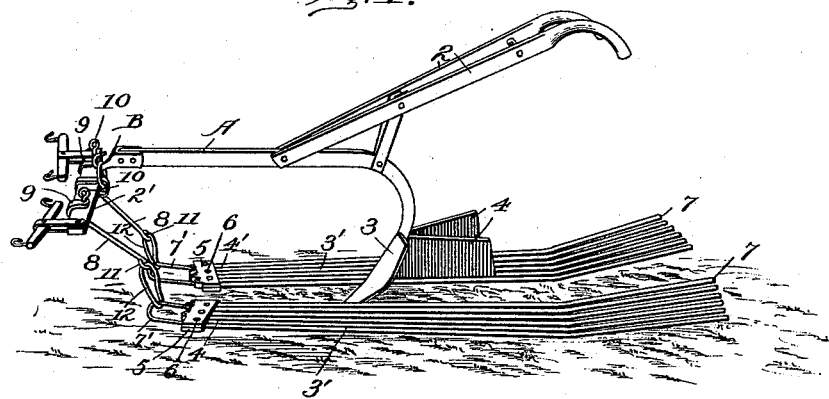
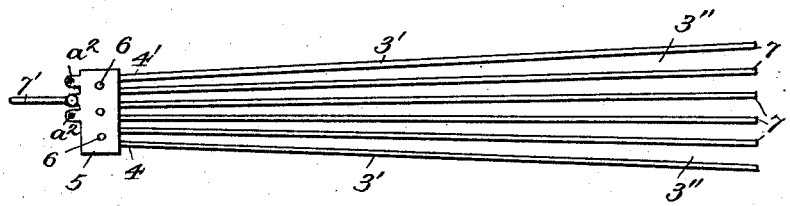

UNITED STATES PATENT OFFICE.

CHARLES D. HERSHEY, OF HALL'S CORNERS, NEW YORK.

POTATO-DIGGER.

SPECIFICATION forming part of Letters Patent No. 578,635, dated March 9, 1897.

Application filed July 18, 1896. Serial No. 599,607. (No model.)

*To all whom it may concern:*

Be it known that I, CHARLES D. HERSHEY, of Hall's Corners, in the county of Ontario and State of New York, have invented an Improvement in Potato-Diggers, of which the following is a specification.

The present invention relates to a sifting attachment for potato-diggers by means of which the dirt plowed up by the digger to which it may be attached is separated from the potatoes.

With this object in view the invention consists of the details of construction and arrangement which will more fully appear hereinafter.

In the accompanying drawings, which form a part of this application, Figure 1 represents my sifting attachment in use. Fig. 2 is a top plan view of one of the sifters.

Like numerals and letters of reference indicate corresponding parts in both views.

Referring to the drawings, A is the beam of a plow constructed in the ordinary manner, having handles 2 and plowshare 3 and mold-board 4 attached thereto. B is a clevis attached to the forward end of the said beam, and has the doubletree 2' connected thereto in the ordinary manner. The sifting apparatus consists of two series of rods of like construction, one on each side of the plowshare, and are connected at their forward ends to the said doubletree, as will hereinafter be described. The said sifter consists of a series of rods 3, clamped at their forward ends 4 to a clevis-plate 5 by means of bolts 6. The rear ends 7 thereof terminate upwardly, as shown, and also diverge outwardly, thus making the spaces 3' between the said rods considerably wider at the rear than at the forward ends, thus allowing the potatoes to slide through and preventing them from being carried along with the sifter. The clevis-plate 5 has a series of holes $a^2$, in which the clevis 7 may be adjusted. Coupling-rods 8 have hooks 9 at one end for connecting said rods to the doubletree 2', the said hooks having the thumb-screws 10 for securing the coupling thereto. Eyes 11 are situated in the downward ends of the said coupling-rods 8, in which are secured the twisted links 12, which are used for lengthening or shortening the couplings.

Having thus described my invention, what I claim as new, and desire to secure by Letters Patent, is—

In the herein-described device, the combination with a plow, a doubletree connected to the beam of said plow, coupling-rods attached to the said doubletree, twisted links attached to the said coupling-rods and to clevises, the said clevises, clevis-plates clamped to the ends of a series of rods, the rear ends of said rods terminating upwardly, the spaces between said rods growing wider toward the rear, substantially as set forth and described.

In testimony whereof I affix my signature in the presence of two witnesses.

CHARLES D. HERSHEY.

Witnesses:
W. C. MEAD,
W. M. BLACK.